R. SCHUBARDT.
DEVICE FOR THE PRODUCTION OF MEDICINAL BATHS.
APPLICATION FILED JULY 25, 1906.

908,150.
Patented Dec. 29, 1908.

Witnesses:
E. O. Hildebrand
M. B. Taylor.

Inventor:
Robert Schubardt
by Georgii & Massie
attorney

THE NORRIS PETERS CO., WASHINGTON, D. C.

UNITED STATES PATENT OFFICE.

ROBERT SCHUBARDT, OF BERLIN, GERMANY.

DEVICE FOR THE PRODUCTION OF MEDICINAL BATHS.

No. 908,150.　　　Specification of Letters Patent.　　　Patented Dec. 29, 1908.

Application filed July 25, 1906. Serial No. 327,770.

*To all whom it may concern:*

Be it known that I, ROBERT SCHUBARDT, a subject of the King of Prussia, German Emperor, and a resident at Kurfürsten-strasse 139, Berlin, Germany, have invented an Improved Device for the Production of Medicinal Baths, of which the following is a full, clear, and exact specification.

The present invention relates to and has for its object an improved device for the production of medicinal baths.

Medicinal baths, for example carbonic acid baths, which are increasingly used in therapeutics are generally prepared by the ingredients being added separately to the bath-water, in such a manner that, in the case of carbonic acid baths for example, the sodium bicarbonate is first dissolved and then the acid or acid salts are added; in consequence mixtures of various substances in a vessel permitting the admission of water are employed for medicinal baths. In these methods the ingredients act on one another in the open bath, but nevertheless the reaction or development is dependent on the slow or quick addition of the acid or of the acid salt, on the relative proportion of the ingredients to one another or to the quantity of water, or lastly on the skill of the person whose duty it is to prepare and manage the bath. Thus the possibility is not excluded that besides injuries and damage, the reactions may take place violently and large quantities of gas may suddenly form which in the case of carbonic acid and sulfureted baths menace life and health and may lead to oppression in breathing and oppression of the heart, fainting, or the like. Now while in these methods which are already known the reactions take place in the open bath, in the method according to the present invention the reaction and generation of gas takes place in a device which consists of a plurality of perforated vessels one inserted in another, in the hollow spaces of which the ingredients for the bath are separated. The adaptation, size and form of the vessels, as also their openings, are so formed that a corresponding quantity of gas is generated in a definite time by means of reciprocal action and self-regulation.

Figure 1:
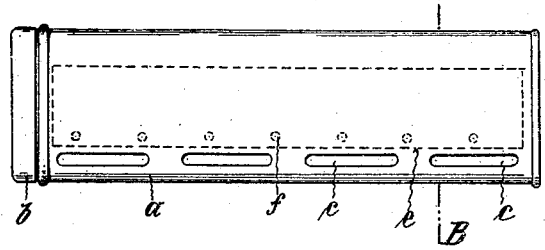
Figure 2:
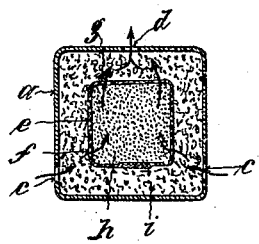
Figure 3:
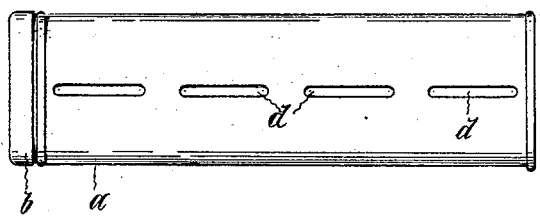

More particularly the present invention consists in a device for use in the production of medicinal baths and in order that the details of construction and action of my invention may be more clearly understood, reference is made to the accompanying drawing in which one form of the device is shown by way of example, and in which:

Figure 1 is a side elevation, Fig. 2 is a section on the line A—B in Fig. 1, and Fig. 3 is a plan of the device.

Similar letters of reference refer to similar parts in all views.

The device consists of an outer vessel $a$ made of metal, wood, clay or other suitable material, of optional shape, with a lid $b$, lateral openings $c$, and upper openings $d$, and an inner vessel $e$ preferably of metal-foil which is rolled together after inserting the material to be inclosed. There are likewise lateral openings $f$ and upper openings $g$ in the inner vessel. For example, an acid or an acid salt $h$ is put in the vessel $e$ and, for example, an alkali or an alkaline salt $i$ in the space between the inner and outer vessel. Now if this entire receptacle filled with chemicals is placed on the bottom of a bath filled with water, in such a manner that the openings $d$ are uppermost, then the water comes in the first place through the openings $c$ and $d$ to the alkaline salt, for example sodium bicarbonate $i$, in the outer cylinder $a$. The solution which is formed goes through the openings $f$ and $g$ into the second inner vessel $e$ which is, for example, filed with acid or with an acid salt $h$. Thus a reaction or generation of gas takes place. The gas goes through the openings $g$ and $d$ into the water of the bath and simultaneously presses the sodium bicarbonate solution back out of the inner cylinder $e$ if the quantity of gas cannot escape rapidly enough, whereby the generation becomes weaker. Vice versa, in the same proportion as the gas escapes, the sodium bicarbonate solution comes again through the openings $f$ to the acid in the inner cylinder $e$, whereby the generation of gas is begun afresh or is increased, the gas again escaping through the upper openings $g$ and $d$ of the inner and outer vessels respectively, while the admission of water takes place again almost exclusively through the lateral openings $c$, while the alkaline solution enters almost exclusively through the lateral openings $f$ into the inner space of the vessel $e$. In this way a circulation and self-regulation takes place which can be considerably aided by employing liquid acid, for example sulfuric acid, which has been converted to a firm mass by the addition of salts, for example, of acid sodium sulfate, or of pumice-stone, or other solid bodies.

While I have described in the foregoing specification the construction of parts preferred I am aware that numerous changes of construction may be made without departing from the spirit and scope of my invention, and I therefore do not wish to be understood as limiting myself by the positive terms employed in connection with the description, excepting such as the state of the art may require.

What I claim as my invention and desire to secure by Letters Patent is:

1. A device for use in the production of medicinal baths, comprising an outer receptacle containing two reacting chemicals separated from each other by an inner receptacle, both receptacles being provided with openings for the admission of liquid to their respective interiors.

2. A device for use in the production of medicinal baths, comprising two receptacles one within the other, said receptacles containing two reacting chemicals, one in each receptacle, the said receptacles being each provided with imperforate bottoms, and sides and tops having openings of relatively restricted area.

3. A device for use in the production of medicinal baths, comprising an inner and an outer receptacle separated by a chemical ingredient, the inner receptacle containing a chemical which will react with the first mentioned chemical ingredient, each of said receptacles comprising an imperforate bottom, sides provided with openings near the bottom only, and a top provided with openings of relatively restricted area.

4. A device for use in the production of medicinal baths comprising in combination a receptacle having a plurality of openings in its side and top, and containing an alkali, a receptacle having a plurality of openings in its sides and top, and containing an acid, adapted to be inclosed in the aforesaid receptacle, substantially as shown, for the purpose specified.

5. A device for use in the production of medicinal baths comprising in combination a receptacle containing an alkaline salt having a plurality of openings in its sides and top, a lid adapted to fit said receptacle, a metal-foil receptacle containing an acid salt having a plurality of openings in its sides and top adapted to be inclosed in the aforesaid receptacle, substantially as shown, for the purpose specified.

6. A device for use in the production of medicinal baths comprising in combination a cylindrical receptacle ($a$) having openings ($c$) in its sides and openings ($d$) in its top-side, and containing sodium bicarbonate ($i$), a lid ($b$) adapted to fit said receptacle, a cylindrical metal-foil receptacle ($e$) having a plurality of openings ($f$) in its sides and openings ($g$) in its top-side, and containing an acid salt ($h$), and adapted to be inclosed by said lid in said receptacle, said receptacles being entirely separated one from another, substantially as shown, for the purpose specified.

7. A device for use in the production of medicinal baths comprising in combination a metal receptacle having a plurality of openings in its side and top, and containing sodium bicarbonate, a lid adapted to engage said receptacle, a lead receptacle containing acid sodium sulfate having a plurality of openings in its sides and top adapted to be inclosed by the aforesaid receptacle, substantially as shown, for the purpose specified.

In testimony whereof I have signed my name to this specification in the presence of the two subscribing witnesses.

ROBERT SCHUBARDT.

Witnesses:
HENRY HASPER,
WOLDEMER HAUPT.